United States Patent
Ding et al.

(10) Patent No.: US 12,192,964 B2
(45) Date of Patent: Jan. 7, 2025

(54) RESOURCE SELECTION METHOD AND APPARATUS, ELECTRONIC DEVICE AND STORAGE MEDIUM

(71) Applicant: GUANGDONG OPPO MOBILE TELECOMMUNICATIONS CORP., LTD., Guangdong (CN)

(72) Inventors: Yi Ding, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 378 days.

(21) Appl. No.: 17/679,982

(22) Filed: Feb. 24, 2022

(65) Prior Publication Data
US 2022/0182985 A1 Jun. 9, 2022

Related U.S. Application Data

(63) Continuation of application No. PCT/CN2020/080682, filed on Mar. 23, 2020.

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 72/20* (2023.01); *H04W 72/542* (2023.01)

(58) Field of Classification Search
CPC ..... H04W 72/02; H04W 72/04; H04W 72/12; H04W 72/20; H04W 72/23; H04W 72/51;
(Continued)

(56) References Cited

U.S. PATENT DOCUMENTS 10,536,826 B2 * 1/2020 Lee ..................... H04W 72/543
10,694,347 B2 * 6/2020 Lee ..................... H04W 8/005
(Continued)

FOREIGN PATENT DOCUMENTS

CN 101583167 A 11/2009
CN 101873650 A 10/2010
(Continued)

OTHER PUBLICATIONS

The EESR of corresponding European application No. 20927518.9. dated Sep. 20, 2022.
(Continued)

*Primary Examiner* — Man U Phan
(74) *Attorney, Agent, or Firm* — Ladas & Parry LLP

(57) ABSTRACT

The present application relates on a resource selection method and apparatus, an electronic device and a storage medium, where if the maximum number of DMRS ports corresponding to a PSSCH is at least two, the UE compares an RSRP of a channel with a preset received power threshold, and determines whether to perform resource exclusion in a resource selection window of the UE according to a comparison result, thereby determining an implementation method where comparison with SL-RSRP is performed according to measured RSRP values of two or more DMRS ports when the PSSCH is two-layer transmission, and it is also possible to compare a measured RSRP value of a DMRS port with the SL-RSRP for resource selection when the PSSCH is two-layer transmission, so that the resource selection method can be applied in a variety of scenarios.

18 Claims, 4 Drawing Sheets

A UE compares an RSRP of a channel with a preset received power threshold if a maximum number of DMRS ports corresponding to a PSSCH is at least two — S101

The UE determines whether to perform resource exclusion in a resource selection window of the UE according to a comparison result — S102

(51) Int. Cl.
*H04W 72/20* (2023.01)
*H04W 72/542* (2023.01)

(58) Field of Classification Search
CPC ..... H04W 74/08; H04W 74/00; H04W 76/14;
H04W 76/27; H04W 76/30; H04W 92/18;
H04W 4/08; H04W 8/00; H04W 24/10;
H04W 36/34; H04W 28/20; H04W 40/24;
H04L 5/00; H04L 5/14; H04L 27/26
USPC ........................................................ 370/329
See application file for complete search history.

(56) References Cited

U.S. PATENT DOCUMENTS

| | | | | |
|---|---|---|---|---|
| 10,757,550 | B2* | 8/2020 | Lee | H04W 72/543 |
| 11,129,138 | B2* | 9/2021 | Li | H04L 5/0044 |
| 11,310,776 | B2* | 4/2022 | Maaref | H04W 72/20 |
| 11,317,382 | B2* | 4/2022 | Lee | H04W 4/40 |
| 11,967,999 | B2* | 4/2024 | Yang | H04W 24/10 |
| 2017/0332207 | A1 | 11/2017 | Sheng | H04W 4/027 |
| 2019/0075603 | A1 | 3/2019 | Hong et al. | |
| 2020/0029340 | A1* | 1/2020 | He | H04W 72/56 |
| 2022/0271892 | A1* | 8/2022 | Peng | H04L 5/0094 |
| 2022/0346118 | A1* | 10/2022 | Wu | H04L 1/1825 |
| 2022/0416976 | A1* | 12/2022 | Baek | H04W 72/51 |
| 2023/0199801 | A1* | 6/2023 | Hahn | H04W 72/25 370/329 |

FOREIGN PATENT DOCUMENTS

| | | |
|---|---|---|
| CN | 101938773 A | 1/2011 |
| CN | 102065556 A | 5/2011 |
| CN | 102457894 A | 5/2012 |
| CN | 103002483 A | 3/2013 |
| CN | 103037443 A | 4/2013 |
| CN | 103747471 A | 4/2014 |
| CN | 105611499 A | 5/2016 |
| CN | 105992287 A | 10/2016 |
| CN | 106559443 A | 4/2017 |
| CN | 106658618 A | 5/2017 |
| CN | 107306412 A | 10/2017 |
| CN | 107306413 A | 10/2017 |
| CN | 107666681 A | 2/2018 |
| CN | 107734551 A | 2/2018 |
| CN | 108024264 A | 5/2018 |
| CN | 108024273 A | 5/2018 |
| CN | 108271253 A | 7/2018 |
| CN | 108633065 A | 10/2018 |
| CN | 109121209 A | 1/2019 |
| CN | 109286983 A | 1/2019 |
| CN | 109644436 A | 4/2019 |
| CN | 109769282 A | 5/2019 |
| CN | 110383721 A | 10/2019 |
| CN | 110831052 A | 2/2020 |
| JP | 2021502742 A | 1/2021 |
| KR | 20190130174 A | 11/2019 |
| WO | 2019031926 A1 | 2/2019 |
| WO | 2019066629 A1 | 4/2019 |
| WO | 2019091143 A1 | 5/2019 |

OTHER PUBLICATIONS

The first Office Action of corresponding Indian application No. 202217009341, dated Oct. 26, 2022.
International Search Report (ISR) dated Dec. 9, 2020 for Application No. PCT/CN2020/080682.
MCC Support:Draft Report of 3GPP TSG RAN WG1 #100-e v0.1.1.
3GPP TS 38.214 V16.0.0 (Dec. 2019);3rd Generation Partnership Project; Technical Specification Group Radio Access Network;NR;Physical layer procedures for data (Release 16).
3GPP TS 38.215 V16.0.1 (Jan. 2020);3rd Generation Partnership Project;Technical Specification Group Radio Access Network;NR;Physical layer measurements (Release 16).
The first Office Action of corresponding Japanese application No. 2022-515913, dated Dec. 12, 2023.
The second Office Action of corresponding European application No. 20927518.9, dated Nov. 30, 2023.
The first Office Action of corresponding Chinese application No. 202210226748.8, dated Apr. 5, 2023.
The first Office Action of corresponding European application No. 20 927 518.9, dated Jun. 12, 2023.
Sequans Communications, On NR sidelink physical layer structure, R1-1911306, 3GPP TSG RAN WG1 Meeting #98bis, Chongqing, China, Oct. 14-20, 2019.
The Hearing Notice of corresponding Indian application No. 202217009341, dated May 21, 2024.

* cited by examiner

RESOURCE SELECTION METHOD AND APPARATUS, ELECTRONIC DEVICE AND STORAGE MEDIUM

CROSS-REFERENCE TO RELATED APPLICATIONS

This application is a continuation of International Application No. PCT/CN2020/080682, filed on Mar. 23, 2020, which is hereby incorporated by reference in its entirety.

TECHNICAL FIELD

The present application relates to the field of NR-V2X communications, and in particular, to a resource selection method and apparatus, an electronic device and a storage medium.

BACKGROUND

Device to Device (D2D) is a sidelink (SL) transmission technology, which is different from a way in which communication data is received or sent through a base station in a traditional cellular system. Regarding D2D technology, the 3rd generation partnership project (3GPP) defines two transmission modes: mode A and mode B. Mode A: a transmission resource of a terminal is allocated by a base station, and the terminal sends data on a sidelink according to the resource allocated by the base station; the base station may allocate a single transmission resource for the terminal, or allocate a semi-static transmission resource for the terminal. Mode B: a vehicle-mounted terminal selects a transmission resource in a resource pool for data transmission. For example, the terminal may select the transmission resource from the resource pool by means of sensing, or select the transmission resource from the resource pool by means of random selection.

In new radio (NR)-vehicle to everything (V2X), there will also be a vehicle to vehicle (V2V) terminal-to-terminal communication mode, and NR-V2X needs to support autonomous driving, and thus, higher requirements are put forward for data interaction between vehicles, such as higher throughput, lower delay, higher reliability, larger coverage, and more flexible resource allocation, etc. A physical layer structure of NR-V2X is as shown in FIG. 1. It can be seen that a physical sidelink control channel (PSCCH) used to transmit sidelink control information is included in a physical sidelink shared channel (PSSCH) used to transmit data, which means that the PSCCH and the PSSCH should be sent at the same time. At present, in the standard, it is only supported that an initial transmission resource of a current data transport block (TB) reserves a retransmission resource of the current TB, a retransmission resource of the current TB reserves a retransmission resource of the current TB, and an initial transmission resource or a retransmission resource of a previous TB reserves an initial transmission resource or a retransmission resource of the current TB. As shown in FIG. 2, the initial transmission resource of TB 2 reserves the retransmission resource 1 and the retransmission resource 2 of TB 2, and the retransmission resource 1 of TB 2 reserves the retransmission resource 2 of TB 2. Meanwhile, the initial transmission resource of TB 1 reserves the initial transmission resource of TB 2, the retransmission resource 1 of TB 1 reserves the retransmission resource 1 of TB 2, and the retransmission resource 2 of TB 1 reserves the retransmission resource 2 of TB 2. The above three resource reservation intervals between TBs are the same. Therefore, when a user equipment (UE) senses a PSCCH on the initial transmission resource of TB 1, it is possible to determine time-frequency resource locations of the retransmission resource 1 and retransmission resource 2 of TB 1 and the initial transmission resource of TB 2. In addition, because the resource reservation intervals between TBs are the same, the UE may also calculate time-frequency resource locations of the retransmission resource 1 and the retransmission resource 2 of the TB 2.

Therefore, when the UE works in the above-mentioned mode B, the UE may obtain sidelink control information sent by another UE by sensing a PSCCH sent by another UE, thereby knowing a resource reserved by another UE. When the UE performs resource selection, the resource reserved by another UE is excluded, thereby avoiding resource collisions. Thus, when the UE performs resource selection, whether it needs to exclude a resource reserved by other UEs has a corresponding trigger mechanism.

In NR-V2X, transmission of PSCCH only supports single-layer transmission (single demodulation reference signal (DMRS) port), while transmission of PSSCH supports transmission with up to two layers (single DMRS port or two DMRS ports). At present, the NR-V2X standard describes a trigger mechanism for single-layer PSSCH transmission.

SUMMARY

Based on this, it is necessary to provide a resource selection method and apparatus, an electronic device, and a storage medium.

In a first aspect, an embodiment of the present application provides a resource selection method, and the method includes:
  comparing, by a user equipment UE, a reference signal received power (RSRP) of a channel with a preset received power threshold if a maximum number of DMRS ports corresponding to a PSSCH is at least two; where the channel is a PSCCH sensed by the UE or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE; and
  determining whether to perform resource exclusion in a resource selection window of the UE according to a comparison result.

In a second aspect, an embodiment of the present application provides a resource selection method, and the method includes:
  comparing, by a UE, an RSRP of a channel with a preset received power threshold, if a resource pool used by the UE is configured such that an RSRP of a PSSCH scheduled by a PSCCH sensed is used to compare with the preset received power threshold, and a field corresponding to a number of DMRS ports in sidelink control information (SCI) transmitted in a PSCCH sensed by the UE is a preset value; where the channel is the PSCCH sensed by the UE or a PSSCH scheduled by the PSCCH sensed by the UE; and
  determining whether to perform resource exclusion in a resource selection window of the UE according to a comparison result.

In a third aspect, an embodiment of the present application provides a resource selection apparatus, including:

a comparison module, configured to compare an RSRP of a channel with a preset received power threshold if a maximum number of DMRS ports corresponding to a PSSCH is at least two; where the channel is a PSCCH sensed by a UE or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE; and a determination module, configured to determine whether to perform resource exclusion in a resource selection window of the UE according to a comparison result.

In a fourth aspect, an embodiment of the present application provides a resource selection apparatus, including:

a comparison module, configured to compare, by a UE, an RSRP of a channel with a preset received power threshold, if a resource pool used by the UE is configured as that an RSRP of a PSSCH scheduled by a sensed PSCCH is used to compare with the preset received power threshold, and a field corresponding to a number of DMRS ports in SCI transmitted in a PSCCH sensed by the UE is a preset value; and a determination module, configured to determine whether to perform resource exclusion in a resource selection window of the UE according to a comparison result.

In a fifth aspect, an embodiment of the present application provides an electronic device, including: a processor, a memory, and a transceiver, and the processor, the memory, and the transceiver communicate with each other through an internal connection path, where the memory is configured to store program code; and the processor is configured to call the program code stored in the memory to cooperate with the transceiver to implement steps of the method according to any one of the first aspect.

In a sixth aspect, an embodiment of the present application provides an electronic device, including: a processor, a memory, and a transceiver, and the processor, the memory, and the transceiver communicate with each other through an internal connection path, where the memory is configured to store program code; and the processor is configured to call the program code stored in the memory to cooperate with the transceiver to implement steps of the method according to any one of the second aspect.

In a seventh aspect, an embodiment of the present application provides a computer-readable storage medium on which a computer program is stored, and when the computer program is executed by a processor, steps of the method described in any one of the first aspect are implemented.

In an eighth aspect, an embodiment of the present application provides a computer-readable storage medium on which a computer program is stored, and when the computer program is executed by a processor, steps of the method described in any one of the second aspect are implemented.

In the resource selection method and apparatus, the electronic device, and the storage medium provided in the embodiments of the present application, if the maximum number of DMRS ports corresponding to the PSSCH is at least two, the UE compares the RSRP of a channel with the preset received power threshold, and determines whether to perform resource exclusion in the resource selection window of the UE according to the comparison result. Since the maximum number of DMRS ports corresponding to the PSSCH is the maximum number of DMRS ports of the PSSCH scheduled by the PSCCH sensed by the UE, or the maximum number of DMRS ports of the PSSCH transmitted in the resource pool used by the UE, when the maximum number of DMRS ports corresponding to the PSSCH is 2 or more, that is, when the PSSCH is two-layer transmission, it is possible to compare the RSRP of the PSCCH sensed or the RSRP of the PSSCH scheduled by the PSCCH with the preset received power threshold, and determine whether to perform resource exclusion in the resource selection window of the UE according to the comparison result, thereby determining the implementation method where comparison with a sidelink-reference signal received power (SL-RSRP) is performed according to measured RSRP values of two or more DMRS ports when the PSSCH is two-layer transmission. It is also possible to compare a measured RSRP value of a DMRS port with the SL-RSRP for resource selection when the PSSCH is two-layer transmission, so that the resource selection method can be applied in a variety of scenarios.

DESCRIPTION OF EMBODIMENTS

In order to make the purpose, the technical solution, and the advantage of embodiments of the present application clearer, the technical solution in embodiments of the present application will be clearly and completely described below with reference to the accompanying drawings. It should be understood that the described specific embodiments here are merely used to explain the present application and are not used to limit the present application.

In NR-V2X, there will also be a V2V terminal-to-terminal communication mode, and when a UE works in the above-mentioned mode B, the UE may obtain sidelink control information (SCI) sent by another UE by sensing a PSCCH sent by another UE, thereby knowing a resource reserved by another UE. When the UE performs resource selection, the resource reserved by another UE will be excluded, thereby avoiding resource collisions.

Figure 3:
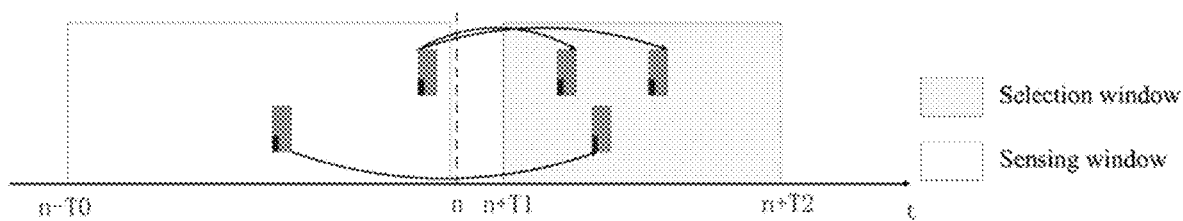
FIG. 3 is a schematic diagram of resource selection provided by an embodiment.

As shown in FIG. 3, a UE generates a data packet at time n and needs to perform resource selection. All resources in the resource selection window are taken as a set A. The resource selection window starts from n+T1 and ends at n++T2. T1>=a time period for the terminal to prepare data to be sent and perform resource selection, and T2 min<=T2<=a range of a service delay requirement, where the value of T2 min is 11, 5, 10, 20)*$2^\mu$ time slots, μ=0, 1, 2, 3 corresponding to the sub-carrier interval of 15, 30, 60, 120 kHz. The UE performs resource sensing from n−T0 to n−Tproc,0, the value of T0 is 100 or 1100 milliseconds, and Tproc,0 is a time period required for the terminal to decode control information.

Figure 1:
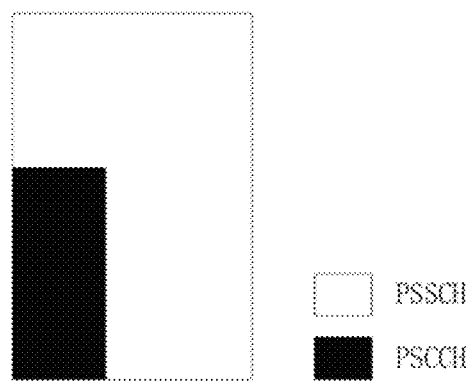
FIG. 1 is a schematic diagram of a physical layer structure of NR-V2X provided by an embodiment.
Figure 2:
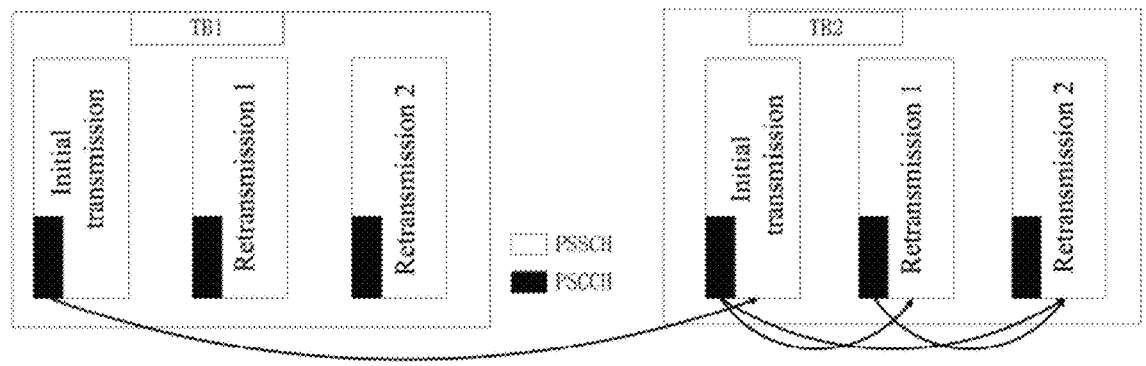
FIG. 2 is a schematic diagram of an initial transmission or a retransmission of a TB provided by an embodiment.

If a terminal sends data in some time slots in a sensing window but does not perform sensing, it needs to exclude all resources in time slots corresponding to the time slots in which the data is sent in the resource selection window. For example, the terminal does not perform resource sensing in a time slot tm, and a configuration of a resource pool used by the terminal includes a (pre-)configured resource reservation period set T={100, 200, 300, 400, 500, 600, 700, 800} ms, then the terminal will calculate whether time slots tm+100, tm+200, tm+300, tm+400, tm+500, tm+600, tm+700, tm+800 are in the resource selection window, and supposing that time slots tm+100, tm+200, tm+300, tm+400, tm+500 are in the resource selection window, the terminal then excludes all resources in time slots tm+100, tm+200, tm+300, tm+400, and tm+500 from the resource set A. Note that the values in the resource reservation period set T includes possible values of the resource reservation interval between TB 1 and TB 2 in FIG. 2, that is, the resource reservation interval between TB 1 and TB 2 in FIG. 2 is one in the set T.

After all the resources in the time slots corresponding to the time slots in which resource sensing is not performed are excluded by the above method, the terminal may exclude a resource which is reserved by SCI and which belongs to the resource selection window from the set A according to resource reservation information in the SCI transmitted in the PSCCH which is sensed, and the method is as follows:

Step 1: if a PSCCH is sensed in the sensing resource window, the terminal measures an RSRP of the PSCCH or an RSRP of a PSSCH scheduled by the PSCCH (that is, the RSRP of the PSSCH sent at the same time as the PSCCH). If the measured RSRP of the PSCCH or the measured RSRP of the PSSCH is greater than an SL-RSRP threshold, and it is determined, according to resource reservation information in SCI transmitted in the PSCCH, that a resource reserved by the SCI is within the resource selection window, the corresponding resource is excluded from the set A. If after the above two resource exclusions, remaining resources in the resource set A are less than X % of all resources in the initial resource set A, the SL-RSRP threshold is raised by 3 dB, and step 1 is performed again.

Step 2: After the resource exclusions, the terminal randomly selects several resources from the remaining resources of set A as the transmission resource for its initial transmission and retransmission.

The above-mentioned SL-RSRP threshold is determined by a priority P1 carried in the PSCCH sensed by the terminal and a priority P2 of the data to be sent by the terminal. The terminal obtains an SL-RSRP threshold table through network configuration or pre-configuration, and the SL-RSRP threshold table includes SL-RSRP thresholds corresponding to all priority combinations. For example, as shown in Table 1, assuming that priority levels of P1 and P2 are 0-7, then the SL-RSRP thresholds corresponding to different priority combinations are represented by γ ij, where i in γ ij is the value of priority level P1, and j is the value of priority level P2.

TABLE 1

| P2 | P1 | | | | | | | |
|---|---|---|---|---|---|---|---|---|
| | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When the terminal senses a PSCCH sent by another UE, the terminal obtains the priority P1 carried in the SCI transmitted in the PSCCH and the priority P2 of the data to be sent, and the terminal determines the SL-RSRP threshold by looking up Table 1.

Furthermore, whether the terminal uses the measured PSCCH-RSRP or the PSSCH-RSRP scheduled by the PSCCH to compare with the SL-RSRP threshold depends on resource pool configuration of the resource pool used by the terminal. The configuration of the resource pool may be configured by a network or pre-configured.

In addition, in NR-V2X, a re-evaluation of selected resources after resource selection and before sending an initial transmission is also supported.

Figure 4:
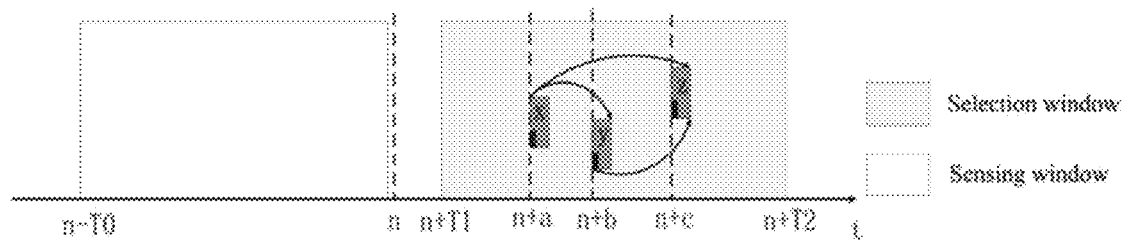
FIG. 4 is a schematic diagram of resource reselection provided by an embodiment.

As shown in FIG. 4, a terminal generates data at time n, determines a resource sensing window and a resource selection window to perform resource selection, and the terminal selects an initial transmission resource x at time n+a, and retransmission resources y and z at time n+b and n+c. After time n, the terminal will continue to sense a PSCCH. Furthermore, the terminal performs the resource exclusion process of step 1 at least once at time n+a-T3, where T3 is a time period required for the terminal to perform resource selection. If the resources x, y, and z are not excluded after the resource exclusion, there is no need for resource reselection. If part or all of the resources x, y, and z are excluded after the resource exclusion, the terminal performs resource reselection for an excluded resource, or performs resource reselection for all selected resources x, y, and z.

In NR-V2X, resource preemption is also supported. In FIG. 4, the terminal selects resources x, y, and z at time n. After the terminal sends the initial transmission at time n+a and reserves the resources y and z, it will continue to sense a PSCCH. If the terminal discovers that another terminal with a higher priority has preempted the resource y or z, and the measured PSCCH-RSRP or PSSCH-RSRP is greater than the SL-RSRP threshold, the terminal performs resource reselection for the preempted resource. Here, the SL-RSRP threshold is also determined by the priority P1 in the PSCCH sensed by the terminal and the priority P2 of the data to be sent by the terminal.

Note that the above terminal performs resource selection at time n, resource selection in the re-evaluation process and resource selection for a preempted resource, and the SL-RSRP thresholds in these three cases may be the same or different.

In NR-V2X, PSCCH transmission only supports single-layer transmission (single DMRS port), and PSSCH transmission supports transmission with up to two layers (single DMRS port or two DMRS ports). SCI transmitted in the PSCCH includes a field corresponding to a number of DMRS ports. Illustratively, when a value of this field is 0, it is indicated that the PSSCH scheduled by the PSCCH is single-layer transmission, while when a value of this field is 1, it is indicated that the PSSCH scheduled by the PSCCH is two-layer transmission.

Figure 5:
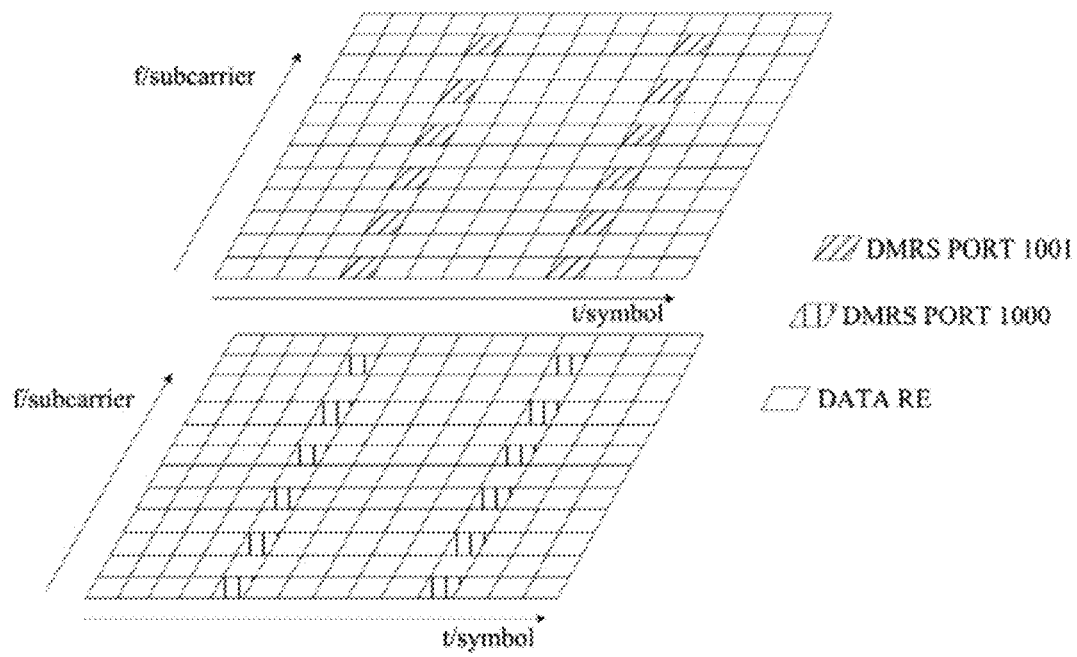
FIG. 5 is a schematic diagram of a PSSCH adopting two-layer transmission.

For example, FIG. 5 shows a schematic diagram of a PSSCH adopting two-layer transmission. A smallest unit in a frequency domain is a subcarrier, a smallest unit in a time domain represents a symbol, and a subcarrier and a time domain symbol determine a resource element (RE). When a PSSCH adopts two-layer transmission, a DMRS port 1000 and a DMRS port 1001 belong to a code division multiplexing (CDM) group, which are distinguished by orthogonal codes. All data REs of the two layers may be used for data mapping. Therefore, two-layer transmission can increase throughput of the PSSCH transmission. At the same time, for these two DMRS ports, the terminal performs transmission with equal power.

As can be seen from the foregoing, the UE performing resource selection at time n, performing Step 1 in a re-evaluation process, and performing resource reselection for a preempted resource, all involve measuring an RSRP of a PSCCH sensed or an RSRP of a PSSCH scheduled by the PSCCH, and making a comparison with the SL-RSRP threshold, where the SL-RSRP threshold is determined by looking up the table according to the priority P1 carried in the PSCCH sensed and the priority P2 of the data to be sent by the UE.

When the resource pool used by the UE is configured or pre-configured as that an RSRP of a PSSCH scheduled by a PSCCH is used to compare with the SL-RSRP threshold, if it meets:

$$PSSCH\text{-}RSRP > \gamma_{ij} \quad (1)$$

then the UE excludes a corresponding time-frequency resource from the resource selection window according to the PSCCH sensed. The PSSCH-RSRP in formula 1 is the RSRP of the PSSCH scheduled by the PSCCH sensed by the UE. $\gamma_{ij}$ is the SL-RSRP threshold, i is the value of the priority P1 carried in the sensed PSCCH, and j is the value of the priority P2 of the data to be sent by the UE.

The description of the above existing mechanisms is about the default case of PSSCH single-layer transmission. When a field corresponding to the number of DMRS ports in the SCI transmitted in the PSCCH sensed by the UE is 1, that is, the PSSCH scheduled by the PSCCH adopts two-layer transmission, the UE thus measures two corresponding RSRP values, i.e., PSSCH-RSRP1000 and PSSCH-RSRP1001, according to the two DMRS ports, respectively. Meanwhile, transmit powers of the two DMRS ports are both half of the total transmit power, and PSSCH-RSRP1000 and PSSCH-RSRP1001 thus are almost half of PSSCH-RSRP when single-layer transmission is adopted. At present, in the NR-V2X standardization process, how PSSCH-RSRP1000 and PSSCH-RSRP1001 are applied to formula (1) is not discussed, that is, when PSSCH is transmitted with two layers, how to compare the measured RSRP values of the two DMRS ports with SL-RSRP so as to perform resource exclusion is not discussed.

The resource selection method provided by embodiments of the present application can solve the technical problem that "in the NR-V2X standardization process, when the PSSCH is transmitted with two layers, how to compare the RSRP values measured for the two DMRS ports with the SL-RSRP so as to perform resource exclusion is not discussed". It should be noted that the method for processing information reporting of the present application is not limited to solving the above technical problem, but can also be used to solve other technical problems, which is not limited in the present application.

Figure 6:
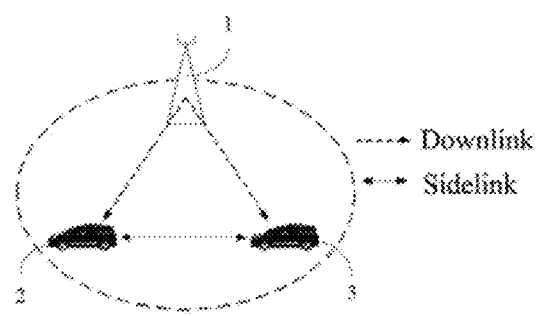
FIG. 6 and FIG. 7 are respectively schematic diagrams of scenarios of a resource selection method provided by embodiments of the present application.
Figure 7:
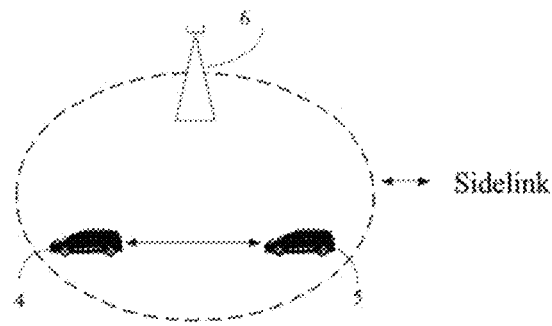

FIG. 6 and FIG. 7 are respectively schematic diagrams of scenarios of a resource selection method provided by embodiments of the present application. As shown in FIG. 6, this scenario includes a network device 1, UE2, and UE3, where mode A is used for resource scheduling, that is, the data transmission resources of UE2 and UE3 are both scheduled by the network device 1. As shown in FIG. 7, this scenario includes UE4 and UE5, where mode B is used for resource scheduling, that is, the data transmission resources of UE4 and UE5 are obtained by the UEs from a resource pool. In an implementation, FIG. 7 may also include a network device 6 in this scenario, but the network device 6 will not participate in the resource scheduling of UE4 and UE5. The network device 1 and the network device 6 may be a base station, a core network device, etc., and may also be implemented by an independent base station or a base station cluster composed of multiple base stations. The UEs may be, but is not limited to various personal computers, notebook computers, smart phones, tablet computers, and portable wearable devices.

Figure 8:
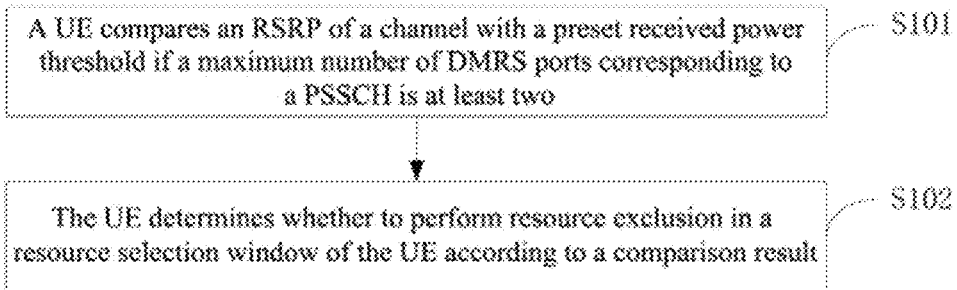
FIG. 8 is a flowchart of a resource selection method provided by an embodiment.

FIG. 8 is a flowchart of a resource selection method provided by an embodiment. The method relates to a specific implementation where when a maximum number of demodulation reference signal (DMRS) ports corresponding to a PSSCH is at least two, a user equipment UE compares an RSRP of a channel with a preset received power threshold, to determine whether to perform resource exclusion in a resource selection window of the UE. The executive entity of the method is any UE in FIG. 6 or FIG. 7. As shown in FIG. 8, the method may include the following steps:

S101: A UE compares an RSRP of a channel with a preset received power threshold if a maximum number of DMRS ports corresponding to a PSSCH is at least two.

The channel is a PSCCH sensed by the UE or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE.

In this embodiment, the maximum number of DMRS ports corresponding to the PSSCH may be a maximum number of DMRS ports indicated in SCI transmitted in the PSCCH that may be sensed by the UE. For example, when a field corresponding to the number of DMRS ports in the SCI transmitted in the PSCCH sensed by the UE is 1, it is indicated that the maximum number of DMRS ports corresponding to the PSSCH is 2. Or, the maximum number of DMRS ports corresponding to the PSSCH is also the maximum number of DMRS pons of the PSSCH transmitted in the resource pool used by the UE. The maximum number of DMRS ports corresponding to the PSSCH may also be determined by other ways, which is not limited in the embodiment of the present application.

In this embodiment, when the UE determines that the maximum number of DMRS ports corresponding to the PSSCH is at least two, it compares the RSRP of the channel with the preset received power threshold, where the UE may compare the RSRP of the sensed PSCCH with the preset received power threshold, or may compare the RSRP of the PSSCH scheduled by the sensed PSCCH with the preset received power threshold. The received power threshold may be obtained according to the foregoing Table 1. For example, the UE queries Table 1 to obtain the received power threshold according to a priority P1 carried in the PSCCH sensed and a priority P2 of data to be sent by the UE.

Illustratively, the RSRP of the PSSCH scheduled by the PSCCH may be RSRPs of respective DMRS ports of the PSSCH, or an average value of the RSRPs of respective DMRS ports of the PSSCH, or a sum of the RSRPs of respective DMRS ports of the PSSCH, and so on. Correspondingly, the UE may compare the RSRPs of respective DMRS ports of the PSSCH with the received power threshold, or compare the average value of the RSRPs of respective DMRS ports of the PSSCH with the received power threshold, or compare the sum of the RSRPs of respective DMRS ports of the PSSCH with the received power threshold, and so on, which is not limited in this embodiment of the present application.

It should be noted that, whether the UE uses the RSRP of the PSCCH sensed or the RSRP of the PSSCH scheduled by the PSCCH to compare with the received power threshold, depends on the resource pool configuration of the resource pool used by the UE. The configuration of the resource pool may be configured by a network or pre-configured.

S102. The UE determines whether to perform resource exclusion in a resource selection window of the UE according to a comparison result.

The comparison result indicates a magnitude relationship between the RSRP of the channel and the preset received power threshold.

In this embodiment, the UE determines whether resource exclusion needs to be performed in the resource selection window of the UE according to the comparison result. Generally, when the RSRP of the channel is greater than the preset received power threshold, the UE performs resource exclusion in the resource selection window of the UE. For example, when the RSRP of the PSCCH sensed by the UE is greater than the preset received power threshold, or when the RSRP of the PSSCH scheduled by the PSCCH sensed by the UE is greater than the preset received power threshold, resource exclusion is performed in the resource selection window of the UE.

In this embodiment, the UE performs resource selection at time n, which is the time when data arrives, or when Step 1 is performed in a re-evaluation process, or when resource reselection is performed for a preempted resource. The UE determines a resource sensing window [n−T0, n−Tproc,0] and a resource selection window [n+T1, n+T2], and performs sensing in the resource sensing window. When it is determined according to a sensing result that the maximum number of DMRS ports corresponding to the PSSCH is 2 or more than 2, or the maximum number of DMRS ports of the PSSCH transmitted in the resource pool used by the UE is 2 or more than 2, the UE then may compare the RSRP of the PSCCH sensed or the RSRP of the PSSCH scheduled by the PSCCH with the preset received power threshold. When the RSRP of the PSCCH sensed or the RSRP of the PSSCH scheduled by the PSCCH is greater than the preset received power threshold, resource exclusion is performed in the resource selection window [n+T1, n+T2] of the UE.

In an implementation, performing resource exclusion in the resource selection window of the UE includes: excluding a target resource in the resource selection window, where the target resource is a resource reserved by SCI in the PSCCH sensed by the UE.

In this embodiment, the resource that the UE needs to exclude is the resource reserved by the SCI in the PSCCH sensed by the UE. That is, the UE needs to exclude the resource reserved by another UE from its resource selection window to avoid resource sharing with other UEs, which leads to increased mutual interference.

In the resource selection method provided by the embodiment of the present application, if the maximum number of DMRS ports corresponding to the PSSCH is at least two, the UE compares the RSRP of the channel with the preset received power threshold, and determines whether to perform resource exclusion in the resource selection window of the UE according to the comparison result. The maximum number of DMRS ports corresponding to the PSSCH is the maximum number of DMRS ports of the PSSCH scheduled by the PSCCH sensed by the UE, or the maximum number of DMRS ports of the PSSCH transmitted in the resource pool used by the UE, and thus, when the maximum number of DMRS ports corresponding to the PSSCH is 2 or more than 2, that is, when the PSSCH is transmitted with at least two layers, it is possible to compare the RSRP of the PSCCH sensed or the RSRP of the PSSCH scheduled by the PSCCH with the preset received power threshold, and determine whether to perform resource exclusion in the resource selection window of the UE according to the comparison result, thereby determining the implementation method where comparison with the SL-RSRP is performed according to the measured RSRP values of two or more DMRS ports when the PSSCH is at least two-layer transmission. In addition, it is also possible to compare a measured RSRP value of a DMRS port with the SL-RSRP to perform resource selection when the PSSCH is transmitted with at least two layers, so that the resource selection method can be applied in a variety of scenarios.

In the embodiment shown in FIG. 8, there may be multiple ways to determine that the maximum number of DMRS ports corresponding to the PSSCH is at least two. In an embodiment, the maximum number of DMRS ports corresponding to the PSSCH being at least two, includes: a resource pool used by the UE is configured as that an RSRP of a PSSCH scheduled by a sensed PSCCH is used to compare with the received power threshold, and a field corresponding to a number of DMRS ports in SCI transmitted in the PSCCH sensed by the UE is a preset value. In this embodiment, when data of the UE arrives, or when Step 1 is performed in a re-evaluation process, or when resource reselection is performed for a preempted resource, the resource pool used by the UE is configured as that an RSRP of a PSSCH scheduled by a sensed PSCCH is used to compare with the received power threshold, and the field corresponding to the number of DMRS ports in the SCI transmitted in the PSCCH sensed by the UE is the preset value, the UE then compares the RSRP of the channel with the preset received power threshold to perform resource exclusion. Among them, when the field corresponding to the number of DMRS ports in the SCI is the preset value, it is indicated that the number of DMRS ports in the SCI transmitted in the PSCCH is 2 or more than 2, that is, the PSSCH adopts at least two-layer transmission, where the preset value may be 1, may also be "true", etc., which can be set by the person skilled in the art according to actual needs, and is not limited in this embodiment.

In another embodiment, the maximum number of DMRS ports corresponding to the PSSCH being at least two, includes: the maximum number of DMRS ports of a PSSCH transmitted in the resource pool used by the UE is N, where N is greater than 1. When data of the UE arrives, or when Step 1 is performed in a re-evaluation process, or when resource reselection is performed for a preempted resource, the UE compares the RSRP of the channel with the preset received power threshold to perform resource exclusion when the maximum number of DMRS ports of the PSSCH transmitted in the resource pool used by the UE is N. Since N is greater than 1, then N may be 2 or greater than 2, that is, when the PSSCH adopts at least two-layer transmission, the UE may compare the RSRP of the PSCCH sensed or the RSRP of the PSSCH scheduled by the PSCCH with the preset RSRP threshold to perform resource exclusion in the resource selection window of the UE.

In the above two embodiments, two possibilities of the maximum number of DMRS ports of the PSSCH being at least two are provided, so that no matter in which scenario when the PSSCH adopts at least two-layer transmission, the UE can compare the RSRP of the channel with the preset received power threshold to perform resource exclusion, which improves the universality of resource selection.

Embodiment I

On the basis of the above two embodiments, the UE comparing the RSRP of the channel with the preset received power threshold, includes: the UE compares the RSRP of the PSCCH sensed by the UE with the received power threshold.

Furthermore, the determining whether to perform resource exclusion in the resource selection window of the UE according to the comparison result includes: performing resource exclusion in the resource selection window of the UE if the comparison result is that the RSRP of the PSCCH sensed is greater than the received power threshold.

In this embodiment, when the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, or the maximum number of DMRS ports of the PSSCH transmitted in the resource pool used by the UE is N (N>1), the UE compares the PSCCH-RSRP with the SL-RSRP threshold for resource exclusion.

For example, the UE performs resource selection at time n, which is the time when data arrives, or when Step 1 is performed in a re-evaluation process, or when resource reselection is performed for a preempted resource, the UE determines a resource sensing window [n−T0, n−Tproc,0] and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the preset RSRP threshold, and when the field corresponding to the number of DMRS ports in the SCI transmitted in the PSCCH sensed by the UE is 1; or, when the maximum number of DMRS ports of the PSSCH transmitted in the resource pool used by the UE is N, where N>1, if the formula (2) is satisfied:

$$PSCCH\text{-}RSRP > \gamma_{ij} \qquad (2)$$

the UE excludes a corresponding time-frequency resource from the resource selection window according to the PSCCH sensed. The PSCCH-RSRP in formula (2) is the RSRP of the PSCCH sensed by the UE. $\gamma_{ij}$ is the preset RSRP threshold, i is the value of the priority P1 carried in the sensed PSCCH, and j is the value of the priority P2 of the data to be sent by the UE.

In the resource selection method provided by the embodiments of the present application, when the resource pool used by the UE is configured as that an RSRP of a PSSCH scheduled by a sensed PSCCH is compared with the preset RSRP threshold, and when the field corresponding to the number of DMRS ports in the SCI transmitted in the PSCCH sensed by the UE is 1; or when the maximum number of DMRS ports of the PSSCH transmitted in the resource pool used by the UE is at least two, the UE compares the RSRP of the sensed PSCCH with the received power threshold to perform the resource exclusion, so that the UE measures the RSRP of the PSCCH sensed and compares it with the received power threshold, while no need to measure RSRPs of respective DMRS ports of the PSSCH, which can achieve a purpose of rapid resource selection and reduce the power consumption of the UE. Moreover, since the PSCCH always adopts single-layer transmission, it is beneficial to the consistency of UE behavior when each UE compares the PSCCH-RSRP with the RSRP threshold.

Figure 9:
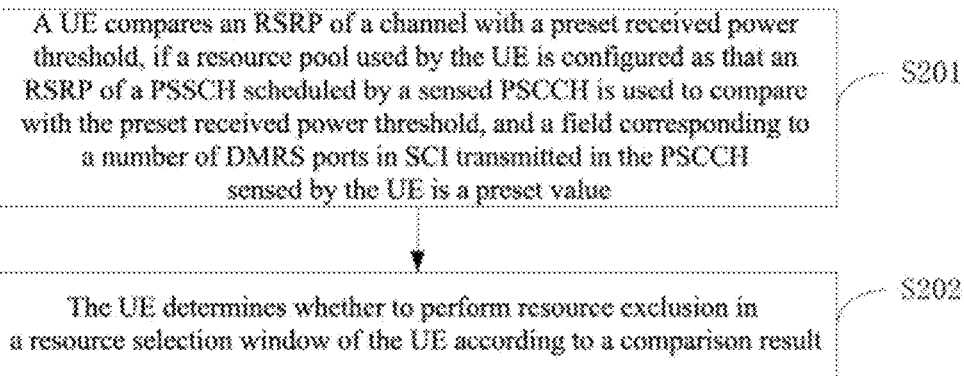
FIG. 9 is a flowchart of a resource selection method provided by another embodiment.

FIG. 9 is a flowchart of a resource selection method provided by another embodiment. The method relates to a specific implementation where when a resource pool used by the UE is configured as that an RSRP of a PSSCH scheduled by a sensed PSCCH is used to compare with a preset received power threshold, and a field corresponding to a number of DMRS ports in SCI transmitted in the PSCCH sensed by the UE is a preset value, the UE compares an RSRP of a channel with the preset received power threshold to perform resource selection. The executive entity of the method is any UE in FIG. 6 or FIG. 7. As shown in FIG. 9, the method may include the following steps:

S201. A UE compares an RSRP of a channel with a preset received power threshold, if a resource pool used by the UE is configured as that an RSRP of a PSSCH scheduled by a sensed PSCCH is used to compare with the preset received power threshold, and a field corresponding to a number of DMRS ports in SCI transmitted in a PSCCH sensed by the UE is a preset value.

The channel is the PSCCH sensed by the UE or a PSSCH scheduled by the PSCCH sensed by the UE. The above preset value may be 1, or may be "true", etc., and when the field corresponding to the number of DMRS ports in the SCI is the preset value, it is indicated that the number of DMRS ports in the SCI transmitted in the PSCCH is 2 or more than 2, that is, the PSSCH adopts at least two-layer transmission, where the preset value may be set by the person skilled in the art according to actual needs, which is not limited in this embodiment.

In this embodiment, at the time of data arrival or at the time when the UE performs Step 1 in a re-evaluation process or when the UE performs resource reselection for a pre-empted resources, if the resource pool used by the UE is configured as that an RSRP of a PSSCH scheduled by a sensed PSCCH is used to compare with the preset received power threshold, and the field corresponding to the number of DMRS ports in the SCI transmitted in the PSCCH sensed by the UE is the preset value, then the UE compares the RSRP of the channel with the preset received power threshold.

The UE may compare the RSRP of the sensed PSCCH with the preset received power threshold, or may compare the RSRP of the PSSCH scheduled by the sensed PSCCH with the preset received power threshold. The received power threshold may be obtained according to the foregoing Table 1. For example, the UE queries Table 1 to obtain the received power threshold according to the priority P1 carried in the sensed PSCCH and the priority P2 of the data to be sent by the UE.

Illustratively, the RSRP of the PSSCH scheduled by the PSCCH may be RSRPs of respective DMRS ports of the PSSCH, or an average value of the RSRPs of respective DMRS ports of the PSSCH, or may also be a sum of the RSRPs of respective DMRS ports of the PSSCH, and so on. Correspondingly, the UE may compare the RSRPs of respective DMRS ports of the PSSCH with the received power threshold, or compare the average value of the RSRPs of respective DMRS ports of PSSCH with the received power threshold, or compare the sum of the RSRPs of respective DMRS ports of the PSSCH with the received power threshold, and so on, which is not limited in this embodiment of the present application.

It should be noted that, whether the UE compares the RSRP of the PSCCH sensed or the RSRP of the PSSCH scheduled by the PSCCH with the received power threshold, depends on the resource pool configuration of the resource pool used by the UE. The configuration of the resource pool may be configured by a network or pre-configured.

S202: Determine whether to perform resource exclusion in a resource selection window of the UE according to a comparison result.

In this embodiment, the UE determines whether it is necessary to perform resource exclusion in the resource selection window of the UE according to the comparison result. Generally, when the RSRP of the channel is greater than the preset received power threshold, the UE performs resource exclusion in the resource selection window of the UE. For example, when the RSRP of the PSCCH sensed by the UE is greater than the preset received power threshold, or when the RSRP of the PSSCH scheduled by the PSCCH sensed by the UE is greater than the preset received power threshold, resource exclusion is performed in the resource selection window of the UE.

In this embodiment, the UE performs resource selection at time n, which is the time when data arrives, or when Step 1 is performed in a re-evaluation process, or when resource reselection is performed for preempted a resource. The UE determines a resource sensing window [n−T0, n−Tproc,0] and a resource selection window [n+T1, n+T2]. When the resource pool used by the UE is configured as that an RSRP of a PSSCH scheduled by a sensed PSCCH is used to compare with the preset received power threshold, and the field corresponding to the number of DMRS ports in the SCI transmitted in the PSCCH sensed by the UE is a preset value, the CE may compare the RSRP of the PSCCH sensed or the RSRP of the PSSCH scheduled by the PSCCH with the preset received power threshold, and when the RSRP of the PSCCH sensed or the RSRP of the PSSCH scheduled by the PSCCH is greater than the preset received power threshold, resource exclusion is performed in the resource selection window [n+T1, n+T2] of the UE.

In the resource selection method provided by the embodiment of the present application, if the resource pool used by the UE is configured as that an RSRP of a PSSCH scheduled by a sensed PSCCH is used to compare with the preset received power threshold, and the field corresponding to the number of DMRS ports in the SC transmitted in the PSCCH sensed by the UE is the preset value, the UE then compares the RSRP of the channel with the preset received power threshold, and determines whether to perform resource exclusion in the resource selection window of the UE according to the comparison result. Since when the field corresponding to the number of DMRS ports in the SC transmitted in the PSCCH sensed by the UE is a preset value, it is indicated that the PSSCH is at least two-layer transmission, it is possible to compare the RSRP of the PSCCH sensed or the RSRP of the PSSCH scheduled by the PSCCH with the preset received power threshold, and determine whether to perform resource exclusion in the resource selection window of the UE according to the comparison result, thereby determining the implementation method where comparison with the SL-RSRP is performed according to the measured RSRP values of two or more DMRS ports when the PSSCH is at least two-layer transmission.

In the embodiment shown in FIG. 9, the UE may compare the RSRP of the sensed PSCCH with the preset received power threshold, and may also compare the RSRP of the PSSCH scheduled by the sensed PSCCH with the preset received power threshold. In the above Embodiment 1, the implementation where the UE compares the RSRP of the PSCCH sensed by the UE with the preset received power threshold is described in detail. The following focuses on the implementation in which the UE compares the RSRP of the PSSCH scheduled by the sensed PSCCH with the preset received power threshold.

Embodiment II

In this embodiment, the UE comparing the RSRP of the channel with the preset received power threshold includes: the UE compares an RSRP of a PSSCH with the received power threshold; where the PSSCH is the PSSCH scheduled by the PSCCH sensed by the UE.

Furthermore, the determining whether to perform resource exclusion in the resource selection window of the UE according to the comparison result includes: performing resource exclusion in the resource selection window of the UE if the comparison result is that the RSRP of the PSSCH is greater than the received power threshold.

In this embodiment, when the resource pool used by the UE is configured as that an RSRP of a PSSCH scheduled by a sensed PSCCH is used to compare with the SL-RSRP threshold, and when the field corresponding to the number of DMRS ports in the SCI transmitted in the PSCCH sensed by the UE is 1, the UE decreases the SL-RSRP threshold by M dB or the UE increases the measured PSSCH-RSRP value by M dB; where M is configured by a network or pre-configured or determined according to resource pool configuration information or selected by the UE.

For example, the UE performs resource selection at time n, which is the time when data arrives, or when Step 1 is performed in a re-evaluation process, or when resource reselection is performed for a preempted resource. The UE determines a resource sensing window [n−T0, n−Tproc,0] and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the RSRP threshold, and the field corresponding to the number of DMRS ports in the SCI transmitted in the PSCCH sensed by the UE is 1, the UE compares the RSRP of the PSSCH scheduled by the sensed PSCCH with the RSRP threshold to perform resource selection.

In some scenarios, when the field corresponding to the number of DMRS ports in the SCI transmitted in the PSCCH sensed by the UE is 0, it is indicated that the PSSCH scheduled by the PSCCH sensed by the UE is single-layer transmission, and the PSSCH-RSRP measured by the UE is relative to the total transmit power of a UE which transmits the PSSCH, and the UE compares the RSRP of the PSSCH with the RSRP threshold. When the field corresponding to the number of DMRS ports in the SC transmitted in the PSCCH sensed by the UE is 1, it is indicated that the PSSCH scheduled by the PSCCH is two-layer transmission, and since during PSSCH two-layer transmission, transmit powers of two DMRS ports are both half of the total transmit power of the UE that transmits the PSSCH, if the UE averages the measured RSRP values of the two DMRS ports, the RSRP of the PSSCH measured by the UE is almost half of the RSRP of the PSSCH during single-layer transmission. In order to maintain the fairness of comparison inequality, the RSRP of the PSSCH needs to be increased or the RSRP threshold needs to be decreased, thereby maintaining the fairness and consistency of UE behaviors.

In an embodiment, the UE comparing the RSRP of the PSSCH with the received power threshold, includes: the UE decreases the received power threshold according to a preset adjustment value to obtain a decreased received power threshold; and the UE compares the RSRP of the PSSCH with the decreased received power threshold.

In this embodiment, when the resource pool used by the UE is configured as that an RSRP of a PSSCH scheduled by a sensed PSCCH is used to compare with the RSRP threshold, and when the field corresponding to the number of DMRS ports in the SCI transmitted in the PSCCH sensed by the UE is 1, if the formula (3) is satisfied:

$$\text{PSSCH-RSRP} > \gamma_{ij} - M \quad (3)$$

the UE excludes a corresponding time-frequency resource from the resource selection window according to the sensed PSCCH. The PSCCH-RSRP in formula (3) is the RSRP of the PSSCH scheduled by the PSCCH sensed by the UE. $\gamma_{ij}$ is the SL-RSRP threshold, i is the value of the priority P1 carried in the sensed PSCCH, and j is the value of the priority P2 of the data to be sent by the UE. M is a decreasing adjustment value of the SL-RSRP threshold, for example, M is 3 dB, where M is configured by a network or pre-configured or determined according to resource pool configuration information or selected by the UE.

In another embodiment, the UE comparing the RSRP of the PSSCH with the received power threshold, includes: the UE increases the RSRP of the PSSCH according to a preset adjustment value to obtain an increased received power threshold; and the UE compares the increased RSRP of the PSSCH with the received power threshold.

In this embodiment, when the resource pool used by the UE is configured as that an RSRP of a PSSCH scheduled by a sensed PSCCH is used to compare with the RSRP threshold, and when the field corresponding to the number of DMRS ports in the SCI transmitted in the PSCCH sensed by the UE is 1, if the formula (4) is satisfied:

$$\text{PSSCH-RSRP} + M > \gamma_{ij} \quad (4)$$

the UE excludes a corresponding time-frequency resource from the resource selection window according to the sensed PSCCH. The PSSCH-RSRP in formula (4) is the RSRP of the PSSCH scheduled by the PSCCH sensed by the UE. $\gamma_{ij}$ is the SL-RSRP threshold, i is the value of the priority P1 carried in the sensed PSCCH, and j is the value of the priority P2 of the data to be sent by the UE. M is an increasing adjustment value of the PSSCH-RSRP, for example, M is 3 dB, where M is configured by a network or pre-configured or determined according to resource pool configuration information or selected by the UE.

In the resource selection method provided by the embodiment of the present application, when the resource pool used by the UE is configured as that an RSRP of a PSSCH scheduled by a sensed PSCCH is used to compare with the RSRP threshold, and when the field corresponding to the number of DMRS ports in the SCI transmitted in the PSCCH sensed by the UE is 1, the UE compares the RSRP of the PSSCH scheduled by the sensed PSCCH with the RSRP threshold to perform resource selection. It is also possible to increase the RSRP of the PSSCH or decrease the RSRP threshold before the comparison to ensure that the remaining resources are available for the UE to perform initial transmission and retransmission after the UE performs resource exclusion in the resource selection window, thereby ensuring the reliability of data transmission and ensuring the consistency and fairness of LE behaviors between single-layer transmission and multi-layer transmission.

Embodiment III

In this embodiment, the UE comparing the RSRP of the channel with the preset received power threshold includes: the UE compares an average value of RSRPs of respective DMRS ports of a PSSCH with the received power threshold; where the PSSCH is the PSSCH scheduled by the PSCCH sensed by the UE.

Furthermore, the determining whether to perform resource exclusion in the resource selection window of the UE according to the comparison result includes: performing resource exclusion in the resource selection window of the UE if the comparison result is that the average value of the RSRPs of respective DMRS ports of the PSSCH is greater than the received power threshold.

In this embodiment, when the field corresponding to the number of DMRS ports in the SCI transmitted in the PSCCH sensed by the UE is 1, the UE measures two RSRP values, i.e., PSSCH-RSRP1000 and PSSCH-RSRP1001, according to the two DMRS ports of the PSSCH, respectively, and the UE compares the average value of PSSCH-RSRP1000 and PSSCH-RSRP1001 with the SL-RSRP threshold. Or, the UE compares the average value of PSSCH-RSRP1000 and PSSCH-RSRP1001 with the SL-RSRP threshold which is decreased by M dB, or compares the average value of PSSCH-RSRP1000 and PSSCH-RSRP1001 which is increased by MdB with the SL-RSRP threshold, where M is configured by a network or pre-configured or determined according to resource pool configuration information or selected by the UE.

In this embodiment, the UE performs resource selection at time n, which is the time when data arrives, or when Step 1 is performed in a re-evaluation process, or when resource reselection is performed for a preempted resource. The UE determines the resource sensing window [n−T0, n−Tproc,0) and the resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the SL-RSRP threshold, and when the field corresponding to the number of DMRS ports in the SCI transmitted in the PSCCH sensed by the UE is 1, the UE calculates the average value of the RSRPs of respective DMRS ports of the PSSCH scheduled by the sensed PSCCH and compares the average value of the RSRPs of respective DMRS ports with the received power threshold, and then performs resource exclusion in the resource selection window of the UE if the average value of the RSRPs of respective DMRS ports is greater than the received power threshold.

In some scenarios, when the field corresponding to the number of DMRS ports in the SCI transmitted in the PSCCH sensed by the UE is 0, it is indicated that the PSSCH scheduled by the PSCCH sensed by the UE is single-layer transmission, and the PSSCH-RSRP measured by the UE is relative to the total transmit power of a UE which transmits the PSSCH, then the UE compares the RSRP of the PSSCH with the RSRP threshold. When the field corresponding to the number of DMRS ports in the SC transmitted in the PSCCH sensed by the UE is 1, it is indicated that the PSSCH scheduled by the PSCCH is two-layer transmission, and since during PSSCH two-layer transmission, transmit powers of the two DMRS ports are both half of the total transmit power of the UE that transmits the PSSCH, if the UE averages the measured RSRP values of the two DMRS ports, the RSRP of the PSSCH measured by the UE is almost half of the RSRP of the PSSCH during single-layer transmission. In order to maintain the fairness of comparison inequality, the RSRP of PSSCH needs to be increased or the RSRP thresholds need to be decreased.

In an embodiment, the UE comparing the average value of the RSRPs of respective DMRS ports of the PSSCH with the received power threshold, includes: the UE decreases the received power threshold according to a preset adjustment value to obtain a decreased received power threshold; and the UE compares the average value of the RSRPs of respective DMRS ports of the PSSCH with the decreased received power threshold.

In this embodiment, when the resource pool used by the UE is configured as that an RSRP of a PSSCH scheduled by a sensed PSCCH is used to compare with the SL-RSRP threshold, and when the field corresponding to the number of DMRS ports in first sidelink control information transmitted in the PSCCH sensed by the UE is 1, if the formula (5) is satisfied:

$$\text{mean}(\text{PSSCH-RSRP}1000, \text{PSSCH-RSRP}1001) > \gamma_{ij} - M \quad (5)$$

the UE excludes a corresponding time-frequency resource from the resource selection window according to the sensed PSCCH. In formula (5). PSSCH-RSRP1000 and PSSCH-RSRP1001 are the RSRP values measured by the UE according to the two DMRS ports of the PSSCH, respectively, and mean (PSSCH-RSRP1000, PSSCH-RSRP1001) means to average the PSSCH-RSRP1000 and PSSCH-RSRP1001, for example, it may be a linear average value, or may be a weighted average value, etc., which is not limited in the embodiment of the present application. $\gamma_{ij}$ is the SL-RSRP threshold, i is the value of the priority P1 carried in the sensed PSCCH, and j is the value of the priority P2 of the data to be sent by the UE. M is a decreasing adjustment value of the SL-RSRP threshold, for example, M is 3 dB, where M is configured by a network or pre-configured or determined according to resource pool configuration information or selected by the UE.

In another embodiment, the UE comparing the average value of the RSRPs of respective DMRS ports of the PSSCH with the received power threshold, includes: the UE increases the average value according to a preset adjustment value to obtain an increased average value; and the UE compares the increased average value with the received power threshold.

In this embodiment, when the resource pool used by the UE is configured as that an RSRP of a PSSCH scheduled by a sensed PSCCH is used to compare with the SL-RSRP threshold, and when the field corresponding to the number of DMRS ports in first sidelink control information transmitted in the PSCCH sensed by the UE is 1, if the formula (6) is satisfied:

$$\text{mean}(\text{PSSCH-RSRP}1000, \text{PSSCH-RSRP}1001) + M > \gamma_{ij} \quad (6)$$

the UE excludes a corresponding time-frequency resource from the resource selection window according to the sensed PSCCH. In formula (6), PSSCH-RSRP1000 and PSSCH-RSRP1001 are the RSRP values measured by the UE according to the two DMRS ports of the PSSCH, respectively, and mean (PSSCH-RSRP1000, PSSCH-RSRP1001) means to average the PSSCH-RSRP1000 and PSSCH-RSRP1001, for example, it may be a linear average value, or may be a weighted average value, etc., which is not limited in the embodiment of the present application. $\gamma_{ij}$ is the SL-RSRP threshold, i is the value of the priority P1 carried in the sensed PSCCH, and j is the value of the priority P2 of the data to be sent by the UE. M is an increasing adjustment value of the mean (PSSCH-RSRP1000 PSSCH-RSRP1001), for example, M is 3 dB, where M is configured by a network or pre-configured or determined according to resource pool configuration information or selected by the UE.

In the resource selection method provided by the embodiment of the present application, when the resource pool used by the UE is configured as that an RSRP of a PSCCH scheduled by a sensed PSCCH is used to compare with the SL-RSRP threshold, and when the field corresponding to the number of DMRS ports in the sidelink control information transmitted in the PSCCH sensed by the UE is 1, the UE calculates the average value of the RSRPs of respective DMRS ports of the PSSCH scheduled by the PSCCH and compares the average value of the RSRPs of respective DMRS ports with the received power threshold to perform resource exclusion thereby ensuring that the average value of the RSRPs of respective DMRS ports is compared with the received power threshold for resource selection during PSSCH two-layer transmission. Furthermore, it is also possible to increase the average value of the RSRPs of respective DMRS ports or decrease the RSRP threshold before the comparison to ensure that the remaining resources can meet a requirement of the UE for initial transmission and retransmission after the UE performs resource exclusion in the resource selection window, thereby ensuring the reliability of data transmission and ensuring the consistency and fairness of UE behaviors between single-layer transmission and multi-layer transmission.

Embodiment IV

In this embodiment, the UE comparing the RSRP of the channel with the preset received power threshold includes: the UE compares a sum of RSRPs of respective DMRS ports of a PSSCH with the received power threshold; where the PSSCH is the PSSCH scheduled by the PSCCH sensed by the UE.

Furthermore, the determining whether to perform resource exclusion in the resource selection window of the UE according to the comparison result includes: performing resource exclusion in the resource selection window of the UE if the comparison result is that the sum of the RSRPs of respective DMRS ports of the PSSCH is greater than the received power threshold.

In this embodiment, when the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, the UE measures two RSRP values. i.e., PSSCH-RSRP1000 and PSSCH-RSRP1001, according to the two DMRS ports of the PSSCH, respectively, and the UE uses the sum of PSSCH-RSRP1000 and PSSCH-RSRP1001 to compare with the SL-RSRP threshold.

For example, the UE performs resource selection at time n, which is the time when data arrives, or when Step 1 is performed in a re-evaluation process, or when resource reselection is performed for a preempted resource. The UE determines a resource sensing window [n−T0, n−Tproc,0) and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the SL-RSRP threshold, and when the field corresponding to the number of DMRS ports in the SCI transmitted in the PSCCH sensed by the UE is 1, if the formula (7) is satisfied:

$$(PSSCH\text{-}RSRP1000+PSSCH\text{-}RSRP1001) > \gamma_{ij} \qquad (7)$$

the UE excludes a corresponding time-frequency resource from the resource selection window according to the sensed PSCCH. In formula (7), PSSCH-RSRP1000 and PSSCH-RSRP1001 are the RSRP values measured by the UE according to the two DMRS ports of the PSSCH, respectively. $\gamma$ ij is the SL-RSRP threshold, i is the value of the priority P1 carried in the sensed PSCCH, and j is the value of the priority P2 of the data to be sent by the UE.

In the resource selection method provided by the embodiment of the present application, when the resource pool used by the UE is configured as that an RSRP of a PSCCH scheduled by a sensed PSCCH is used to compare with the SL-RSRP threshold, and the field corresponding to the number of DMRS ports in the SCI transmitted in the PSCCH sensed by the UE is 1, the UE compares the sum of the RSRPs of respective DMRS ports of the PSSCH with the received power threshold to ensure that the sum of the RSRPs of respective DMRS ports of the PSSCH can be compared with the received power threshold for resource selection during PSSCH two-layer transmission.

Embodiment V

In this embodiment, the UE comparing the RSRP of the channel with the preset received power threshold includes: the UE compares an RSRP of at least one DMRS port of a PSSCH with the received power threshold; where the PSSCH is the PSSCH scheduled by the PSCCH sensed by the UE.

In this embodiment, when the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, the UE measures two RSRP values, i.e., PSSCH-RSRP1000 and PSSCH-RSRP1001, according to the two DMRS ports of the PSSCH, respectively. The UE compares PSSCH-RSRP1000 or PSSCH-RSRP1001 with the SL-RSRP threshold.

In some scenarios, when the field corresponding to the number of DMRS ports in the SCI transmitted in the PSCCH sensed by the UE is 0, it is indicated that the PSSCH scheduled by the PSCCH sensed by the UE is single-layer transmission, and the PSSCH-RSRP measured by the UE is relative to the total transmit power of a UE which transmits the PSSCH, then the UE compares the RSRP of the PSSCH with the RSRP threshold. When the field corresponding to the number of DMRS ports in the SCI transmitted in the PSCCH sensed by the UE is 1, it is indicated that the PSSCH scheduled by the PSCCH is two-layer transmission, and since during PSSCH two-layer transmission, transmit powers of the two DMRS ports are both half of the total transmit power of the UE that transmits the PSSCH, if the UE averages the measured RSRP values of the two DMRS ports, the RSRP of the PSSCH measured by the UE is almost half of the RSRP of the PSSCH during single-layer transmission. In order to maintain the fairness in inequality comparison, the RSRP of PSSCH needs to be increased or the RSRP threshold needs to be decreased.

In an embodiment, the UE comparing the RSRP of the at least one DMRS port of the PSSCH with the received power threshold, includes: the UE decreases the received power threshold according to a preset adjustment value to obtain a decreased received power threshold; and the UE compares the RSRP of the at least one DMRS port of the PSSCH with the decreased received power threshold.

In this embodiment, the UE performs resource selection at time n, which is the time when data arrives, or when Step 1 is performed in a re-evaluation process, or when resource reselection is performed for a preempted resource. The UE determines a resource sensing window [n−T0, n−Tproc,0) and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, if the formula (8) is satisfied:

$$PSSCH\text{-}RSRP100X > \gamma_{ij} - M \qquad (8)$$

the UE excludes a corresponding time-frequency resource from the resource selection window according to the PSCCH sensed. In formula (8), PSSCH-RSRP100X is PSSCH-RSRP1000 or PSSCH-RSRP1001, where PSSCH-RSRP1000 and PSSCH-RSRP1001 are the RSRP values measured by the UE according to the two DMRS ports of the PSSCH, respectively. $\gamma$ ij is the SL-RSRP threshold, i is the value of the priority P1 carried in the sensed PSCCH, and j is the value of the priority P2 of the data to be sent by the UE. M is a decreasing adjustment value of the SL-RSRP threshold, for example, M is 3 dB, where M is configured by a network or pre-configured or determined according to resource pool configuration information or selected by the UE.

In another embodiment, the UE comparing the RSRP of the at least one DMRS port of the PSSCH with the received power threshold, includes: the UE increases the RSRP of the at least one DMRS port according to a preset adjustment value to obtain an increased RSRP of the at least one DMRS port; and the UE compares the increased RSRP of the at least one DMRS port with the received power threshold.

In this embodiment, the UE performs resource selection at time n, which is the time when data arrives, or when Step 1 is performed in a re-evaluation process, or when resource reselection is performed for a preempted resource. The UE determines a resource sensing window (n−T0, n−Tproc,0) and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, if the formula (9) is satisfied:

$$PSSCH\text{-}RSRP100X + M > \gamma_{ij} \qquad (9)$$

the UE excludes a corresponding time-frequency resource from the resource selection window according to the PSCCH sensed. In formula (9), PSSCH-RSRP100X is PSSCH-RSRP1000 or PSSCH-RSRP1001, where PSSCH-RSRP1000 and PSSCH-RSRP1001 are the RSRP values measured by the UE according to the two DMRS ports of the PSSCH, respectively. $\gamma$ ij is the SL-RSRP threshold, i is the value of the priority P1 carried in the sensed PSCCH, and j is the value of the priority P2 of the data to be sent by the UE. M is an increasing adjustment value of PSSCH-RSRP100X, for example, M is 3 dB, where M is configured by a network or pre-configured or determined according to resource pool configuration information or selected by the UE.

In the resource selection method provided by the embodiment of the present application, when the resource pool used by the UE is configured as that an RSRP of a PSSCH scheduled by a sensed PSCCH is used to compare with the SL-RSRP threshold, and the field corresponding to the number of DMRS ports in the SCI transmitted in the PSCCH sensed by the UE is 1, the UE compares the RSRP of the at least one DMRS port of the PSSCH with the decreased received power threshold, and performs resource exclusion in the selection window of the UE when the RSRP of the at least one DMRS port of the PSSCH is greater than the received power threshold to ensure that resource selection can be performed according to the comparison between the RSRPs of respective DMRS ports of the PSSCH and the received power threshold during PSSCH two-layer transmission. Furthermore, it is also possible to increase the RSRPs of respective DMRS ports or decrease the RSRP threshold before the comparison to ensure that the remaining resources can meet a requirement of the UE for initial transmission and retransmission after the UE performs resource exclusion in the resource selection window, thereby ensuring the reliability of data transmission and ensuring the consistency and fairness of UE behaviors between single-layer transmission and multi-layer transmission.

In this embodiment, the UE may select a DMRS port from the DMRS ports of the PSSCH randomly, and compare the RSRP of the DMRS port with the received power threshold. Thus, the UE comparing the RSRP of the at least one DMRS port of the PSSCH with the received power threshold, includes: the UE compares an RSRP of any DMRS port of the PSSCH with the received power threshold.

Correspondingly, the determining whether to perform resource exclusion in the resource selection window of the UE according to the comparison result includes: performing resource exclusion in the resource selection window of the UE if the comparison result is that the RSRP of the any DMRS port is greater than the received power threshold.

In this embodiment, the UE measures two RSRP values, i.e., PSSCH-RSRP1000 and PSSCH-RSRP1001, according to the two DMRS ports of the PSSCH, respectively. The UE compares PSSCH-RSRP1000 or PSSCH-RSRP1001 with the SL-RSRP threshold and performs resource exclusion in the resource selection window of the UE when PSSCH-RSRP1000 or PSSCH-RSRP1001 is greater than the SL-RSRP threshold. The UE may select a DMRS port from the DMRS ports of the PSSCH randomly, and compare the RSRP of the DMRS port with the received power threshold, and thus there is no need to compare the RSRPs of all the DMRS ports of the PSSCH with the RSRP threshold, thereby reducing the load on the UE.

In this embodiment, the UE may also compare the RSRP of each DMRS port of the PSSCH with the received power threshold, and thus the UE comparing the RSRP of the at least one DMRS port of the PSSCH with the received power threshold, includes: the UE compares RSRPs of respective DMRS ports of the PSSCH with the received power threshold.

Correspondingly, the determining whether to perform resource exclusion in the resource selection window of the UE according to the comparison result includes: performing resource exclusion in the resource selection window of the UE if the comparison result is that the RSRP of at least one DMRS port of the PSSCH is greater than the received power threshold.

In this embodiment, the UE measures two RSRP values, i.e., PSSCH-RSRP1000 and PSSCH-RSRP1001, according to the two DMRS ports of the PSSCH, respectively. The UE compares both the PSSCH-RSRP1000 and PSSCH-RSRP1001 with the SL-RSRP threshold and performs resource exclusion in the resource selection window of the UE when at least one PSSCH-RSRP is greater than the SL-RSRP threshold. Although the received power of the two DMRS ports of the PSSCH is the same in theory, however, in actual scenarios, the received powers of the two DMRS ports of the PSSCH may also be different due to some differences. The UE compares the RSRP of each DMRS port of the PSSCH with the received power threshold, and performs resource exclusion in the resource selection window of the UE when the RSRP of at least one DMRS port of the PSSCH is greater than the received power threshold to ensure the accuracy of resource exclusion.

The above-mentioned Embodiment III, Embodiment IV, and Embodiment V may be used as a parallel method with Embodiment II, or may be used as a refinement of various different implementations of the PSSCH-RSRP in Embodiment II, which is not limited in the embodiments of the present application.

Example VI

The resource selection method provided in the embodiment is mainly applied to a scenario where a UE adopts PSSCH single-layer transmission, and the maximum number of DMRS ports corresponding to the PSSCH being at least two, includes: the resource pool used by the UE is configured as that an RSRP of a PSSCH scheduled by a sensed PSCCH is used to compare with the received power threshold, a field corresponding to a number of DMRS ports in sidelink control information transmitted in the PSCCH sensed by the UE is a preset value, and data to be sent by the UE adopts PSSCH single-layer transmission.

In this embodiment, the UE compares the RSRP of the channel with the preset received power threshold, if the resource pool used by the UE is configured as that an RSRP of a PSSCH scheduled by a sensed PSCCH is used to compare with the received power threshold, the field corresponding to the number of DMRS ports in the sidelink control information transmitted in the PSCCH sensed by the UE is the preset value, and the data to be sent by the UE adopts PSSCH single-layer sending.

In this embodiment, the difference from the previous embodiments is that, not only the resource pool used by the UE is configured as that an RSRP of a PSSCH scheduled by a sensed PSCC is used to compare with the received power threshold, and the field corresponding to the number of DMRS ports in the sidelink control information transmitted in the PSCCH sensed by the UE is the preset value, but also the data to be sent by the UE adopts PSSCH single-layer sending, then the UE compares the RSRP of the channel with the preset received power threshold to perform resource selection.

Furthermore, the UE comparing the RSRP of the channel with the preset received power threshold, includes: the UE compares an RSRP of a PSSCH with the received power threshold; where the PSSCH is the PSSCH scheduled by the PSCCH sensed by the UE.

Correspondingly, the determining whether to perform resource exclusion in the resource selection window of the UE according to the comparison result includes: performing resource exclusion in the resource selection window of the UE if the comparison result is that the RSRP of the PSSCH is greater than the received power threshold.

In this embodiment, when the resource pool used by the UE is configured as that an RSRP of a PSCCH scheduled by a sensed PSCCH is used to compare with the SL-RSRP threshold, the field corresponding to the number of DMRS ports in the SCI transmitted in the PSCCH sensed by the UE is 1, and the data to be sent by the UE adopts the PSSCH single-layer sending, then the UE measures two RSRP values, i.e., PSSCH-RSRP1000 and PSSCH-RSRP1001, according to the two DMRS ports of the PSSCH, respectively, and the UE may compares PSSCH-RSRP1000 or PSSCH-RSRP1001 or an average value of PSSCH-RSRP1000 and PSSCH-RSRP1001 with the SL-RSRP threshold, which is not limited in the embodiment of the present application.

In an implementation, the UE comparing the RSRP of the PSSCH with the received power threshold, includes: the UE compares the RSRP of at least one DMRS port of the PSSCH with the received power threshold. Or, in an implementation, the UE comparing the RSRP of the PSSCH with the received power threshold, includes: the UE compares the average value of the RSRPs of respective DMRS ports of the PSSCH with the received power threshold.

In this embodiment, the UE performs resource selection at time n, which is the time when data arrives, or when Step 1 is performed in a re-evaluation process, or when resource reselection is performed for a preempted resource. The UE determines a resource sensing window [n−T0, n−Tproc,0) and a resource selection window [n+T1, n+T2], and performs resource exclusion in the resource selection window according to a sensing result in the resource sensing window. When the resource pool used by the UE is configured as that an RSRP of a PSSCH scheduled by a sensed PSCCH is used to compare with the SL-RSRP threshold, and when the field corresponding to the number of DMRS ports in the SCI transmitted in the PSCCH sensed by the UE is 1, and when the data to be sent by the UE adopts PSSCH single-layer sending, if formula (10) is satisfied:

$$\text{PSSCH-RSRPreal} > \gamma_{ij} \quad (10)$$

the UE excludes a corresponding time-frequency resource from the resource selection window according to the sensed PSCCH. In formula (10), PSSCH-RSRPreal is PSSCH-RSRP1001 or PSSCH-RSRP1000 or the average value of PSSCH-RSRP1000 and PSSCH-RSRP1001, where PSSCH-RSRP1000 and PSSCH-RSRP1001 are the RSRP values measured by the UE according to the two DMRS ports of the PSSCH, respectively. $\gamma_{ij}$ is the SL-RSRP threshold, i is the value of the priority P1 carried in the sensed PSCCH, and j is the value of the priority P2 of the data to be sent by the UE.

In this embodiment, for the implementation of various scenarios where PSSCH-RSRP1000 or PSSCH-RSRP1001 or the average value of PSSCH-RSRP1000 and PSSCH-RSRP1001 is compared with the preset received power threshold, reference may be made to Embodiment III and Embodiment V, which will not repeated here.

In the resource selection method provided by the embodiment of this application, when the UE senses that the PSSCH scheduled by the PSCCH is two-layer transmission, then the reserved resources are likely to be two-layer transmission. When the UE adopts single-layer transmission, if the orthogonality between different DMRS ports is good, the UE will only be affected by a certain layer in the above reserved resources. Therefore, when the resource pool used by the UE is configured as that an RSRP of a PSSCH scheduled by a sensed PSCCH is used to compare with the received power threshold, the field corresponding to the number of DMRS ports in the sidelink control information transmitted in the PSCCH sensed by the UE is the preset value, and the data to be sent by the UE adopts the PSSCH single-layer transmission, the UE compares the RSRP of the PSSCH with the preset received power threshold to perform resource selection, which can improve the accuracy of the resource exclusion.

It should be understood that although the various steps in the flowchart of FIG. 8 or FIG. 9 are displayed in sequence as indicated by the arrows, these steps are not necessarily performed in sequence in the order indicated by the arrows. Unless there is a clear description herein, there is no strict order for the execution of these steps, and these steps may be executed in other orders. Moreover, at least part of the steps in FIG. 8 or FIG. 9 may include multiple sub-steps or multiple stages, where these sub-steps or stages are not necessarily executed at the same time but can be executed at different times, and the order of execution of these sub-steps or stages is not necessarily performed sequentially, instead, they may be performed with other steps or at least part of the sub-steps or stages of other steps in turn or alternately.

Figure 10:
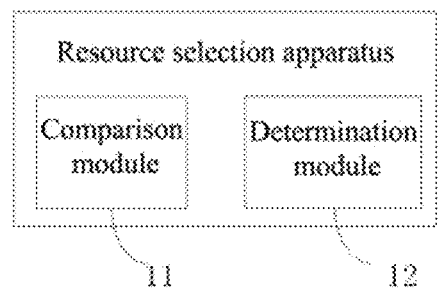
FIG. 10 is a block diagram of a resource selection apparatus provided by an embodiment.

In an embodiment, as shown in FIG. 10, a resource selection apparatus is provided, which includes:

a comparison module 11, configured to compare an RSRP of a channel with a preset received power threshold if a maximum number of DMRS ports corresponding to a PSSCH is at least two; where the channel is a PSCCH sensed by a UE or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE; and a determination module 12, configured to determine whether to perform resource exclusion in a resource selection window of the UE according to a comparison result.

In an embodiment, the maximum number of demodulation reference signal DMRS ports corresponding to the physical sidelink shared channel PSSCH being at least two, includes:

a resource pool used by the UE is configured as that an RSRP of a PSSCH scheduled by a sensed PSCCH is used to compare with the received power threshold, and a field corresponding to a number of DMRS ports in sidelink control information SCI transmitted in the PSCCH sensed by the UE is a preset value.

In an embodiment, the maximum number of demodulation reference signal DMRS ports corresponding to the physical sidelink shared channel PSSCH being at least two, includes:

the maximum number of DMRS ports of a PSSCH transmitted in the resource pool used by the UE is N, where N is greater than 1.

In an embodiment, a resource selection apparatus is also provided. The structure of the apparatus is the same as that of FIG. 10, but the functions of respective modules are different. The apparatus includes:

a comparison module 11, configured to compare an RSRP of a channel with a preset received power threshold, if a resource pool used by the UE is configured as that an RSRP of a PSSCH scheduled by a sensed PSCCH is used to compare with the preset received power threshold, and a field corresponding to a number of DMRS ports in SCI transmitted in the PSCCH sensed by the UE is a preset value; and a determination module 12, configured to determine whether to perform resource exclusion in a resource selection window of the UE according to a comparison result.

In an embodiment, the comparison module 11 is configured to compare an RSRP of the sensed PSCCH with the received power threshold.

In an embodiment, the determination module 12 is configured to perform resource exclusion in the resource selection window of the UE if the comparison result is that the RSRP of the sensed PSCCH is greater than the received power threshold.

In an embodiment, the comparison module 11 is configured to compare an RSRP of a PSSCH with the received power threshold; where the PSSCH is a PSSCH scheduled by the PSCCH sensed by the UE.

In an embodiment, the determination module 12 is configured to perform resource exclusion in the resource selection window of the UE if the comparison result is that the RSRP of the PSSCH is greater than the received power threshold.

In an embodiment, the comparison module 11 is configured to decrease the received power threshold according to a preset adjustment value to obtain a decreased received power threshold; and compare the RSRP of the PSSCH with the decreased received power threshold.

In an embodiment, the comparison module 11 is configured to increase the RSRP of the PSSCH according to a preset adjustment value to obtain an increased RSRP of the PSSCH; and compare the increased RSRP of the PSSCH with the received power threshold.

In an embodiment, the comparison module 11 is configured to compare an average value of RSRPs of respective DMRS ports of a PSSCH with the received power threshold; where the PSSCH is a PSSCH scheduled by the PSCCH sensed by the UE.

In an embodiment, the determination module 12 is configured to perform resource exclusion in the resource selection window of the UE if the comparison result is that the average value of the RSRPs of respective DMRS ports of the PSSCH is greater than the received power threshold.

In an embodiment, the comparison module 11 is configured to decrease the received power threshold according to a preset adjustment value to obtain a decreased received power threshold; and compare the average value of the RSRPs of respective DMRS ports of the PSSCH with the decreased received power threshold.

In an embodiment, the comparison module 11 is configured to increase the average value according to a preset adjustment value to obtain an increased average value; and compare the increased average value with the received power threshold.

In an embodiment, the comparison module 11 is configured to compare a sum of RSRPs of respective DMRS ports of a PSSCH with the received power threshold; where the PSSCH is a PSSCH scheduled by the PSCCH sensed by the UE.

In an embodiment, the determination module 12 is configured to perform resource exclusion in the resource selection window of the UE if the comparison result is that the sum of the RSRPs of respective DMRS ports of the PSSCH is greater than the received power threshold.

In an embodiment, the comparison module 11 is configured to compare an RSRP of at least one DMRS port of a PSSCH with the received power threshold; where the PSSCH is a PSSCH scheduled by the PSCCH sensed by the UE.

In an embodiment, the comparison module 11 is configured to compare an RSRP of any DMRS port of the PSSCH with the received power threshold.

In an embodiment, the determination module 12 is configured to perform resource exclusion in the resource selection window of the UE if the comparison result is that the RSRP of any DMRS port is greater than the received power threshold.

In an embodiment, the comparison module 11 is configured to compare RSRPs of respective DMRS ports of the PSSCH with the received power threshold.

In an embodiment, the determination module 12 is configured to perform resource exclusion in the resource selection window of the UE if the comparison result is that the RSRP of at least one DMRS port of the PSSCH is greater than the received power threshold.

In an embodiment, the comparison module 11 is configured to decrease the received power threshold according to a preset adjustment value to obtain a decreased received power threshold; and compare the RSRP of at least one DMRS port of the PSSCH with the decreased received power threshold.

In an embodiment, the comparison module 11 is configured to increase the RSRP of at least one DMRS port according to a preset adjustment value to obtain an increased RSRP of the at least one DMRS port; and compare the increased RSRP of the at least one DMRS port with the received power threshold.

In an embodiment, the maximum number of DMRS ports corresponding to the PSSCH being at least two, includes: the resource pool used by the UE is configured as that an RSRP of a PSSCH scheduled by a sensed PSCCH is used to compare with the received power threshold, and a field corresponding to a number of DMRS ports in sidelink control information transmitted in the PSCCH sensed by the UE is a preset value, and data to be sent by the UE adopts PSSCH single-layer transmission.

In an embodiment, the comparison module 11 is configured to compare the RSRP of the channel with the preset received power threshold if the resource pool used by the UE is S configured as that an RSRP of a PSSCH scheduled by a sensed PSCCH is used to compare with the received power threshold, the field corresponding to the number of DMRS ports in the sidelink control information transmitted in the PSCCH sensed by the UE is the preset value, and the data to be sent by the UE adopts PSSCH single-layer sending.

In an embodiment, the comparison module 11 is configured to compare an RSRP of a PSSCH with the received power threshold: where the PSSCH is a PSSCH scheduled by the PSCCH sensed by the UE.

In an embodiment, the determination module 12 is configured to perform resource exclusion in the resource selection window of the UE if the comparison result is that the RSRP of the PSSCH is greater than the received power threshold.

In an embodiment, the comparison module 11 is configured to compare the RSRP of at least one DMRS port of the PSSCH with the received power threshold.

In an embodiment, the comparison module 11 is configured to compare an average value of RSRPs of respective DMRS ports of the PSSCH with the received power threshold.

In an embodiment, the determination module 12 is configured to exclude a target resource in the resource selection window, where the target resource is a resource reserved by SCI in the PSCCH sensed by the UE.

The implementation principle and technical effect of the resource selection apparatus provided by the foregoing embodiments are similar to those of the foregoing method embodiments, which will not be repeated here.

For the specific definition of the resource selection apparatus, please refer to the above definition of the resource selection method, which will not be repeated here. Respective modules in the above-mentioned resource selection apparatus may be implemented in whole or in pan by software, hardware, and a combination thereof. The above-mentioned modules may be embedded in the form of hardware or independent of a processor in a computer equipment, or may be stored in a memory of a computer equipment in the form of software, so that a processor calls and executes the operations corresponding to the above-mentioned modules.

Figure 11:
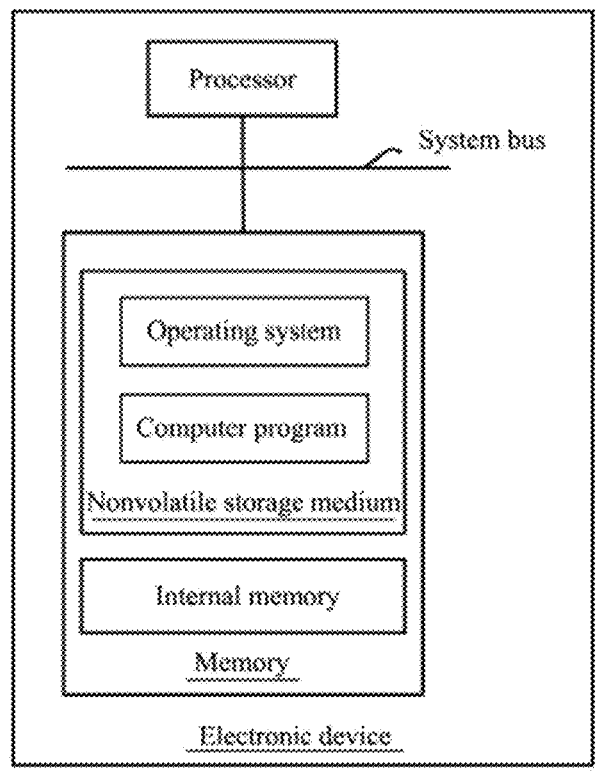
FIG. 11 is a schematic diagram of an internal structure of an electronic device in an embodiment.

FIG. 11 is a schematic diagram of an internal structure of an electronic device in an embodiment. As shown in FIG. 11, the electronic device includes a processor and a memory connected through a system bus. Among them, the processor is configured to provide calculation and control capabilities to support the operation of the entire electronic device. The memory may include a nonvolatile storage medium and an internal memory. The nonvolatile storage medium stores an operating system and a computer program. The computer program may be executed by the processor to implement the resource selection method provided by the above embodiments. The internal memory provides a cached operating environment for the operating system computer program in the nonvolatile storage medium. The electronic device may be any terminal device such as a mobile phone, a tablet computer, a PDA (personal digital assistant), a POS (point of sales), a vehicle-mounted computer, and a wearable device.

The person skilled in the art could understand that the structure shown in FIG. 11 is only a block diagram of part of the structure related to the solution of the present application, and does not constitute a limitation on the computer device to which the solution of the present application is applied. The specific computer device may include more or fewer components than those shown in the figure, or combine certain components, or have a different component arrangement.

In an embodiment, an electronic device is provided, including: a processor, a memory, and a transceiver, the processor, the memory, and the transceiver communicate with each other through an internal connection path, and the memory is configured to store program code; and the processor is configured to call the program code stored in the memory to cooperate with the transceiver to implement steps of any method of the foregoing method embodiments.

The implementation principle and technical effect of the electronic device provided by the foregoing embodiment are similar to those of the foregoing method embodiment, which will not be repeated here.

In an embodiment, a computer-readable storage medium is provided, on which a computer program is stored, and when the computer program is executed by a processor, the steps of any method of the above method embodiments are implemented.

The implementation principle and technical effect of the computer-readable storage medium provided by the foregoing embodiment are similar to those of the foregoing method embodiment, which will not be repeated here.

The person of ordinary skill in the art could understand that all or part of the processes in the above-mentioned embodiment methods may be implemented by instructing relevant hardware through a computer program, where the computer program may be stored in a nonvolatile computer readable storage, and the computer program may include the processes of the above-mentioned method embodiments when executed. Among them, any reference to a memory, a storage, a database or other media used in the embodiments provided in the present application may include nonvolatile and/or volatile memory. The nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM), etc.

The technical features of the above embodiments may be combined arbitrarily. In order to make the description concise, all possible combinations of the technical features in the above embodiments are not described. However, the combination of these technical features should be regarded as the scope of this specification as long as there is no contradiction in the combination of these technical features. The above-mentioned embodiments only describe several implementation manners of the present application, which are described relatively specific and detailed but they should not be understood as a limitation on the scope of the present application patent. It should be noted that for the person of ordinary skill in the art, without departing from the concept of this application, several modifications and improvements can be made, which all fall within the protection scope of the present application. Therefore, the protection scope of the patent in the present application shall be subject to the appended claims.

What is claimed is:

1. A resource selection method, the method comprising:

comparing, by a user equipment (UE), a reference signal received power (RSRP) of a channel with a preset received power threshold if a maximum number of demodulation reference signal (DMRS) ports corresponding to a physical sidelink shared channel (PSSCH) is at least two; wherein the channel is a physical sidelink control channel (PSCCH) sensed by the UE or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE; and determining whether to perform resource exclusion in a resource selection window of the UE according to a comparison result;

wherein the maximum number of DMRS ports corresponding to the PSSCH being at least two, comprises:

the resource pool used by the UE is configured as that an RSRP of a PSSCH scheduled by a sensed PSCCH is used to compare with the received power threshold; and a field corresponding to a number of DMRS ports in sidelink control information (SCI) transmitted in the PSCCH sensed by the UE is a preset value.

2. The resource selection method according to claim 1, wherein the preset value is 1.

3. The resource selection method according to claim 1, wherein the comparing, by the UE, the RSRP of the channel with the preset received power threshold comprises:

comparing, by the UE, an RSRP of the PSCCH sensed with the received power threshold.

4. The resource selection method according to claim 1, wherein the comparing, by the UE, the signal received power RSRP of the channel with the preset received power threshold comprises:

comparing, by the UE, an RSRP of a PSSCH with the received power threshold; wherein the PSSCH is the PSSCH scheduled by the PSCCH sensed by the UE.

5. The resource selection method according to claim 4, wherein the comparing, by the UE, the RSRP of the PSSCH with the received power threshold comprises:

decreasing, by the UE, the received power threshold according to a preset adjustment value to obtain a decreased received power threshold; and comparing, by the UE, the RSRP of the PSSCH with the decreased received power threshold.

6. The resource selection method according to claim 4, wherein the comparing, by the UE, the RSRP of the PSSCH with the received power threshold comprises:

increasing, by the UE, the RSRP of the PSSCH according to a preset adjustment value to obtain an increased RSRP of the PSSCH; and comparing, by the UE, the increased RSRP of the PSSCH with the received power threshold.

7. The resource selection method according to claim 1, wherein the comparing, by the UE, the signal received power RSRP of the channel with the preset received power threshold comprises:

comparing, by the UE, an average value of RSRPs of respective DMRS ports of a PSSCH with the received power threshold; wherein the PSSCH is the PSSCH scheduled by the PSCCH sensed by the UE.

8. The resource selection method according to claim 1, wherein the comparing, by the UE, the RSRP of the channel with the preset received power threshold comprises:

comparing, by the UE, a sum of RSRPs of respective DMRS ports of a PSSCH with the received power threshold; wherein the PSSCH is the PSSCH scheduled by the PSCCH sensed by the UE.

9. The resource selection method according to claim 8, wherein the comparing, by the UE, the sum of the RSRPs of respective DMRS ports of the PSSCH with the received power threshold comprises:

comparing, by the UE, a sum of PSSCH-RSRP1000 and PSSCH-RSRP1001 with the received power threshold; wherein the PSSCH-RSRP1000 and the PSSCH-RSRP1001 are two RSRP values measured respectively according to two DMRS ports of the PSSCH.

10. The resource selection method according to claim 8, wherein the determining whether to perform resource exclusion in the resource selection window of the UE according to the comparison result comprises:

performing resource exclusion in the resource selection window of the UE if the comparison result is that the sum of the RSRPs of respective DMRS ports of the PSSCH is greater than the received power threshold.

11. The resource selection method according to claim 1, wherein the comparing, by the UE, the RSRP of the channel with the preset received power threshold comprises:

comparing, by the UE, an RSRP of at least one DMRS port of a PSSCH with the received power threshold; wherein the PSSCH is the PSSCH scheduled by the PSCCH sensed by the UE.

12. The resource selection method according to claim 1, wherein the performing resource exclusion in the resource selection window of the UE comprises:

excluding a target resource in the resource selection window, wherein the target resource is a resource reserved by sidelink control information (SCI) in the PSCCH sensed by the UE.

13. An electronic device, comprising:
a processor, a memory, and a transceiver, the processor, the memory, and the transceiver communicating with each other through an internal connection path, wherein:

the memory stores program code; and the processor calls the program code stored in the memory to cooperate with the transceiver to:

compare a reference signal received power (RSRP) of a channel with a preset received power threshold if a maximum number of demodulation reference signal (DMRS) ports corresponding to a physical sidelink shared channel (PSSCH) is at least two; wherein the channel is a physical sidelink control channel (PSCCH) sensed by a user equipment (UE) or a PSSCH scheduled by the PSCCH sensed by the UE, and the maximum number of DMRS ports is a maximum number of DMRS ports of the PSSCH scheduled by the PSCCH sensed by the UE, or a maximum number of DMRS ports of a PSSCH transmitted in a resource pool used by the UE; and determine whether to perform resource exclusion in a resource selection window of the UE according to a comparison result;

wherein the maximum number of DMRS ports corresponding to the PSSCH being at least two, comprises:

the resource pool used by the UE is configured as that an RSRP of a PSSCH scheduled by a sensed PSCCH is used to compare with the received power threshold; and a field corresponding to a number of DMRS ports in sidelink control information (SCI) transmitted in the PSCCH sensed by the UE is a preset value.

14. The electronic device according to claim 13, wherein the preset value is 1.

15. The electronic device according to claim 13, wherein the processor calls the program code stored in the memory to cooperate with the transceiver further to compare a sum of RSRPs of respective DMRS ports of a PSSCH with the received power threshold; wherein the PSSCH is the PSSCH scheduled by the PSCCH sensed by the UE.

16. The electronic device according to claim 15, wherein the processor calls the program code stored in the memory to cooperate with the transceiver further to compare a sum of PSSCH-RSRP1000 and PSSCH-RSRP1001 with the received power threshold; wherein the PSSCH-RSRP1000 and the PSSCH-RSRP1001 are two RSRP values measured respectively according to two DMRS ports of the PSSCH.

17. The electronic device according to claim 15, wherein the processor calls the program code stored in the memory to cooperate with the transceiver further to perform resource exclusion in the resource selection window of the UE if the comparison result is that the sum of the RSRPs of respective DMRS ports of the PSSCH is greater than the received power threshold.

18. A computer-readable storage medium with a computer program stored thereon, wherein the computer program, when executed by a processor, causes the processor to execute the following:
   comparing a reference signal received power (RSRP) of a channel with a preset received power threshold if a maximum number of demodulation reference signal (DMRS) ports corresponding to a physical sidelink shared channel (PSSCH) is at least two; wherein the channel is a physical sidelink control channel (PSCCH) sensed by a user equipment (UE) or a PSSCH scheduled by the PSCCH sensed by the UE, and the maximum number of DMRS ports is a maximum number of DMRS ports of the PSSCH scheduled by the PSCCH sensed by the UE or a maximum number of DMRS ports of a PSSCH transmitted in a resource pool used by the UE; and
   determining whether to perform resource exclusion in a resource selection window of the UE according to a comparison result;
wherein the maximum number of DMRS ports corresponding to the PSSCH being at least two, comprises:
the resource pool used by the UE is configured as that an RSRP of a PSSCH scheduled by a sensed PSCCH is used to compare with the received power threshold; and
a field corresponding to a number of DMRS ports in sidelink control information (SCI) transmitted in the PSCCH sensed by the UE is a preset value.

* * * * *